United States Patent
Chen et al.

(10) Patent No.: US 7,403,636 B2
(45) Date of Patent: Jul. 22, 2008

(54) METHOD AND APPARATUS FOR PROCESSING AN IMAGE

(75) Inventors: Xinwu Chen, Beijing (CN); Xin Ji, Beijing (CN); Libing Wang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 1160 days.

(21) Appl. No.: 10/704,591

(22) Filed: Nov. 12, 2003

(65) Prior Publication Data
US 2004/0131236 A1 Jul. 8, 2004

(30) Foreign Application Priority Data
Dec. 30, 2002 (CN) .................... 02 1 60016

(51) Int. Cl.
*G06K 9/00* (2006.01)
*G06K 9/46* (2006.01)

(52) U.S. Cl. .............. 382/103; 382/118; 382/190; 348/77

(58) Field of Classification Search ........... 382/103, 382/118, 190, 199, 203, 224; 348/77
See application file for complete search history.

(56) References Cited

U.S. PATENT DOCUMENTS

| | | | | |
|---|---|---|---|---|
| 5,550,581 A | * | 8/1996 | Zhou | 348/14.12 |
| 5,596,362 A | * | 1/1997 | Zhou | 348/14.01 |
| 5,689,575 A | * | 11/1997 | Sako et al. | 382/118 |
| 5,781,650 A | * | 7/1998 | Lobo et al. | 382/118 |
| 5,835,616 A | * | 11/1998 | Lobo et al. | 382/118 |
| 5,852,669 A | * | 12/1998 | Eleftheriadis et al. | 382/118 |
| 5,870,138 A | * | 2/1999 | Smith et al. | 348/143 |
| 6,611,613 B1 | * | 8/2003 | Kang et al. | 382/118 |
| 6,633,655 B1 | * | 10/2003 | Hong et al. | 382/118 |
| 6,928,231 B2 | * | 8/2005 | Tajima | 386/46 |
| 7,092,554 B2 | * | 8/2006 | Chen et al. | 382/118 |
| 2001/0036298 A1 | * | 11/2001 | Yamada et al. | 382/118 |
| 2002/0081032 A1 | | 6/2002 | Chen et al. | |
| 2003/0021448 A1 | * | 1/2003 | Chen et al. | 382/117 |
| 2003/0108225 A1 | * | 6/2003 | Li | 382/118 |
| 2003/0133599 A1 | * | 7/2003 | Tian et al. | 382/118 |
| 2004/0131236 A1 | * | 7/2004 | Chen et al. | 382/118 |
| 2006/0018517 A1 | * | 1/2006 | Chen et al. | 382/115 |
| 2007/0263909 A1 | * | 11/2007 | Ojima et al. | 382/118 |
| 2007/0263933 A1 | * | 11/2007 | Ojima et al. | 382/190 |
| 2007/0263934 A1 | * | 11/2007 | Ojima et al. | 382/190 |

OTHER PUBLICATIONS

Haiyuan Wu, et al., "Face Detection From Color Images Using a Fuzzy Pattern Matching Method", IEEE Transactions on Pattern Analysis and Machine Intelligence, vol. 21, No. 6, Jun. 1999, pp. 557-563.

Haiyun Wu, et al., "Face Detection and Rotations Estimation Using Color Information", the 5th IEEE International Workshop on Robot and Human Communication, 1996, pp. 341-346.

* cited by examiner

*Primary Examiner*—Aaron W Carter
(74) *Attorney, Agent, or Firm*—Fitzpatrick, Cella, Harper & Scinto (57) ABSTRACT

The present invention provides a method of processing an image, which includes the steps of identifying one candidate for human face region within the image, selecting a mouth neighborhood within the candidate for human face region, processing the mouth neighborhood, and classifying the candidate for human face region based on results of the processing step. According to the method of the present invention, human faces are detected just based on pixels included in the mouth neighborhood, but not all the pixels of the entire face.

24 Claims, 6 Drawing Sheets

METHOD AND APPARATUS FOR PROCESSING AN IMAGE

FIELD OF THE INVENTION

The present invention relates to image processing, and particularly to the method and apparatus for processing an image in which human faces will be detected.

BACKGROUND OF THE INVENTION

A number of techniques are known for detecting areas of interest in an image, such as a face or other identified object of interest. Face detection is an area of particular interest, as face recognition has importance not only for image processing, but also for identification and security purposes, and for human-computer interface purposes. A human-computer interface not only identifies the location of a face, if a face is present, it may also identify the particular face, and may understand facial expressions and gestures.

Many studies on automatic face detection have been reported recently. References for example include "Face Detection and Rotations Estimation using Color Information," the 5th IEEE International Workshop on Robot and Human Communication, 1996, pp 341-346, and "Face Detection from Color Images Using a Fuzzy Pattern Matching Method," IEEE Transaction on Pattern Analysis and Machine Intelligence, vol. 21, no. 6, June 1999.

All the conventional methods of detecting human faces have their own advantages as well as shortcomings depending upon different algorithms used for processing images. Some methods are accurate but are complex and time-consuming.

SUMMARY OF THE INVENTION

The objective of the present invention is to provide a method and apparatus for processing an image in which human faces will be detected based on the pixels located in the mouth neighborhood, and specifically based on the edge information calculated in relation to the mouth neighborhood.

For the attainment of the above objective, the present invention provides a method of processing an image, characterized by comprising steps of:

identifying one candidate for human face region within said image;

selecting a mouth neighborhood within said candidate for human face region;

processing said mouth neighborhood;

classifying said candidate for human face region based on results of said processing step.

The present invention also provides an apparatus for processing an image, characterized by comprising:

a candidate identifier, for identifying one candidate for human face region within said image;

a mouth neighborhood selector, for selecting a mouth neighborhood within said candidate for human face region that has been identified by said candidate identifier;

a mouth neighborhood processor, for processing said mouth neighborhood that has been selected by said mouth neighborhood selector;

a classifier, for classifying said candidate for human face region that has been identified by said candidate identifier based on outputs of said mouth neighborhood processor.

According to the method and apparatus of the present invention, human faces are detected just based on pixels included in the mouth neighborhood, but not all the pixels of the entire face. And the use of edge information in relation to the mouth neighborhood increases the accuracy of detecting human faces.

Additionally, the method of the present invention can be easily combined with various conventional methods of determining candidates for human face regions so as to fit in different situations.

Other features and advantages of the present invention should be apparent from the following description of the preferred embodiments, taken in conjunction with the accompanying drawings, which illustrate, by way of example, the principles of the invention.

DETAILED DESCRIPTION OF THE PREFERRED EMBODIMENT

The present invention will be described in detail. In the following description, as to how to identify one candidate for human face region within an image, reference can be made to Chinese Patent Application No. 00127067.2, which was filed by the same applicant on Sep. 15, 2000, and made public on Apr. 10, 2002, and Chinese Patent Application No. 01132807.X, which was filed by the same applicant on Sep. 6, 2001. These applications are incorporated here for reference. However, the method of identifying candidates for human face regions disclosed in Chinese Patent Applications No. 00127067.2 and No. 01132807.X constitute no restriction to the present invention. Any conventional method of identifying candidates for human face regions within an image may be utilized in the present invention.

Figure 1:
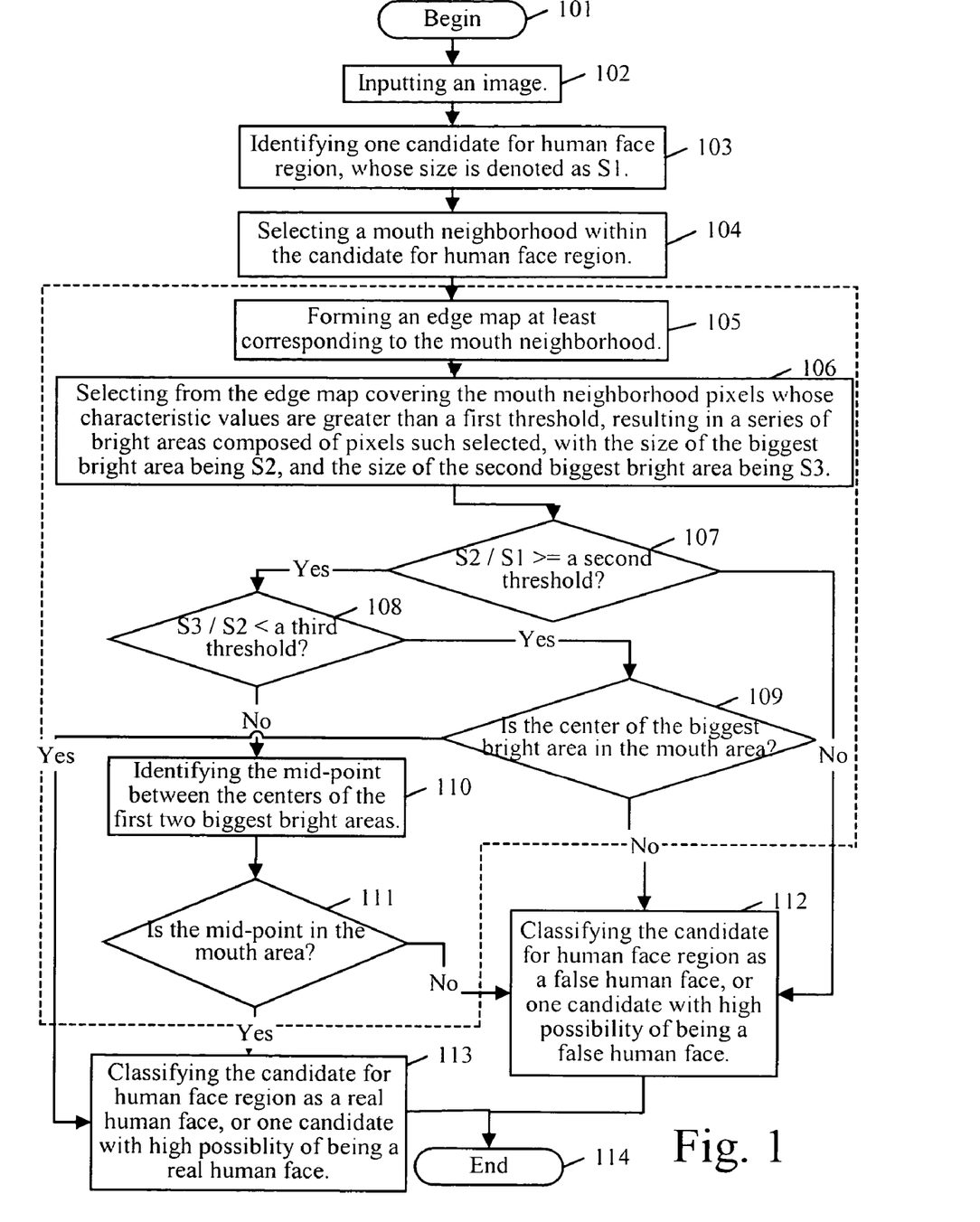
FIG. 1 is a flow chart of the first embodiment of the method of processing an image according to the present invention.

FIG. 1 is a flow chart of the first embodiment of the method of processing an image according to the present invention.

The process begins at step 101. At step 102, an image to be processed is inputted. At step 103, one candidate for human face region is identified within the image inputted at step 102. The size of the candidate for human face region identified at step 103 is denoted as S1. Here, the size of an image is defined as the number of the pixels composing the image.

In steps 102 and 103, any conventional methods of identifying one candidate for human face region within an image can be adopted, and constitute no restriction to the present invention.

At step 104, a mouth neighborhood is selected within the candidate for human face region identified at step 103. As to how to select the mouth neighborhood within one human face, detailed description will be given later with reference to FIG. 4.

Then, the mouth neighborhood is processed.

Figure 2:
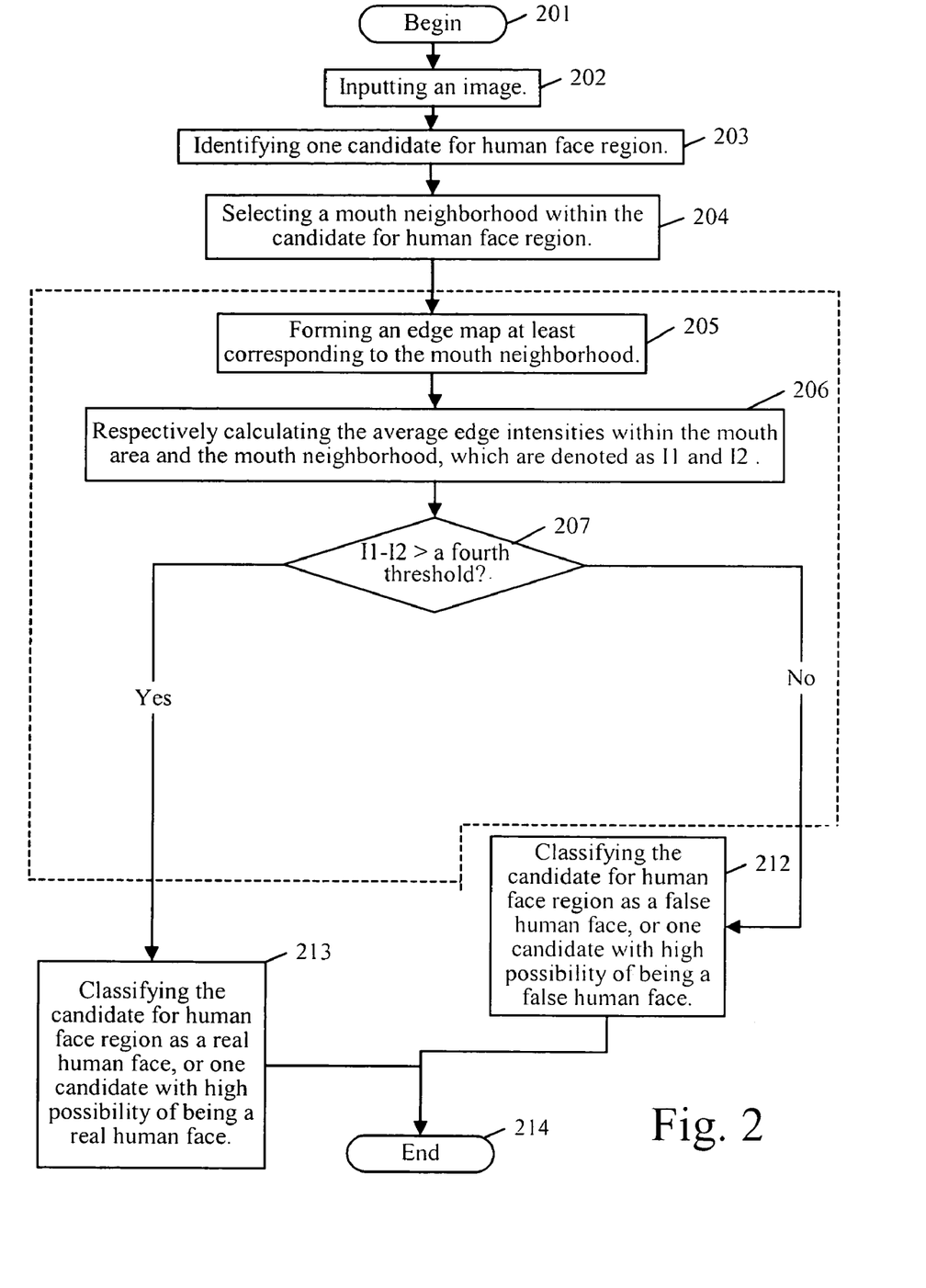
FIG. 2 is a flow chart of the second embodiment of the method of processing an image according to the present invention.

Two different methods of processing the mouth neighborhood are shown at steps 105 to 111 enclosed in the broken line in FIG. 1, and at steps 205 to 207 enclosed in the broken line in FIG. 2. The common ground for the two different methods shown in FIGS. 1 and 2 is that an edge map is first formed for the candidate for human face region or at least for the mouth neighborhood; edge information is calculated for the mouth neighborhood based on the edge map; and finally the edge information is used for classifying the candidate for human face region as one candidate with high possibility of being a real human face, one candidate with high possibility of being a false human face, a real human face or a false human face.

Of course, other methods of processing can be applied to the mouth neighborhood as long as the results of the processing of the mouth neighborhood will be sufficient for classifying the candidate for human face region as one candidate with high possibility of being a real human face, one candidate with high possibility of being a false human face, a real human face or a false human face. And other edge information, in addition to the size of special areas (e.g., bright areas formed at step 106 in FIG. 1) and the average edge intensity within an area (e.g., the two intensities calculated at step 206 in FIG. 2), can be used in the method of processing the mouth neighborhood as long as the edge information will be sufficient for classifying the candidate for human face regions as one candidate with high possibility of being a real human face, one candidate with high possibility of being a false human face, a real human face or a false human face.

Different methods of processing the mouth neighborhood and different edge information do not constitute any restriction to the present invention.

Specifically speaking, in FIG. 1, at step 105, an edge map is formed which at least corresponds to the mouth neighborhood.

It should be noted that if the entire candidate for human face region is converted into an edge map, the order of steps 104 and 105 will not be critical.

That is, an edge map can be formed for the entire candidate for human face region and then a mouth neighborhood is selected within the edge map.

If the candidate for human face region is represented as a gray level diagram, the formed edge map will show a plurality of bright edges against a black background. Each bright edge in the edge map represents that the gray level of the pixels at the corresponding place in the gray level diagram of the candidate for human face region changes significantly. In order to change a gray level diagram into an edge map, conventional "Sobel" operator can be utilized. At the end of the specification, four examples are given in order to explain the methods shown in FIGS. 1 and 2.

At step 106, from the edge map formed at step 105, a plurality of pixels whose characteristic values are greater than a first threshold are selected. These selected pixels, at their own positions, compose a series of bright areas within the edge map.

A unique method of selecting such pixels, referred to as "binarization," will be illustrated in the four examples described at the end of the specification.

Among the series of bright areas, the size of the biggest bright area is denoted as S2, and the size of the second biggest bright area is denoted as S3. As usual, the size of an area is the number of the pixels located within the area. As to how to identify the biggest and the second biggest areas among the series of bright areas, a lot of methods can be utilized. For instance, an algorithm called "Labeling" is applicable here, which is used in the four examples described at the end of the specification.

Then, at step 107, it is decided whether the ratio of S2 to S1 (i.e., S2/S1) is greater than or equal to a second threshold. The second threshold ranges from 0 to 0.1, and preferably takes the value of 0.003. The purpose of step 107 is to decide whether there is a prominent bright area.

If the result of step 107 is Yes, the process goes to step 108; else to step 112.

At step 112, the candidate for human face region is classified as a false human face, or one candidate with high possibility of being a false human face.

At step 108, it is decided whether the ratio of S3 to S2 (i.e., S3/S2) is less than a third threshold. The third threshold ranges from 0.2 to 0.8 and preferably takes the value of 0.5. The purpose of step 108 is to decide whether there is a most prominent bright area.

If the result of step 108 is Yes, the process goes to step 109; else to step 110.

If the process goes to step 109, it means that there is a bright area which is the most prominent among the series of bright areas. If so, this bright area must be the biggest bright area.

At step 109, it is decided whether the center of the biggest bright area is within the mouth area. The mouse area is a predefined area within the mouth neighborhood. As to the definition of mouth area, detailed description will be given later with reference to FIG. 4.

If the result of step 109 is No, the process goes to step 112; else to step 113.

At step 113, the candidate for human face region is classified as a real human face, or one candidate with high possibility of being a real human face.

At step 110, the mid-point between the centers of the first two biggest bright areas is identified. Then, the process goes to step 111.

At step 111, it is decided whether the mid-pointed identified at step 110 is within the mouth area.

If the result of step 111 is Yes, the process goes to step 113; else to step 112.

After steps 112 or 113, the process goes to step 114, where the process of detecting a human face within an image is ended.

Once human faces have been detected within an image, further processing can be conducted on the image, or the detected human faces.

FIG. 2 is a flow chart of the second embodiment of the method of processing an image according to the present invention.

Steps 201-205 and steps 212-214 are similar to steps 101-105 and steps 112-114 in FIG. 1 and detailed description of them are omitted.

As described above with reference to FIG. 1, the edge information utilized in FIG. 2 is the average edge intensities of mouth neighborhood and mouth area.

Specifically speaking, at step 206, the average edge intensities within the mouth area and the mouth neighborhood are respectively calculated, and denoted as I1 and I2. Then, at step 207, it is decided whether the difference between I1 and I2 is greater than a fourth threshold. The fourth threshold ranges from 0 to 50, and preferably takes the value of 5.

If the result of step 207 is No, the process goes to step 212; else to step 213.

Figure 3A:
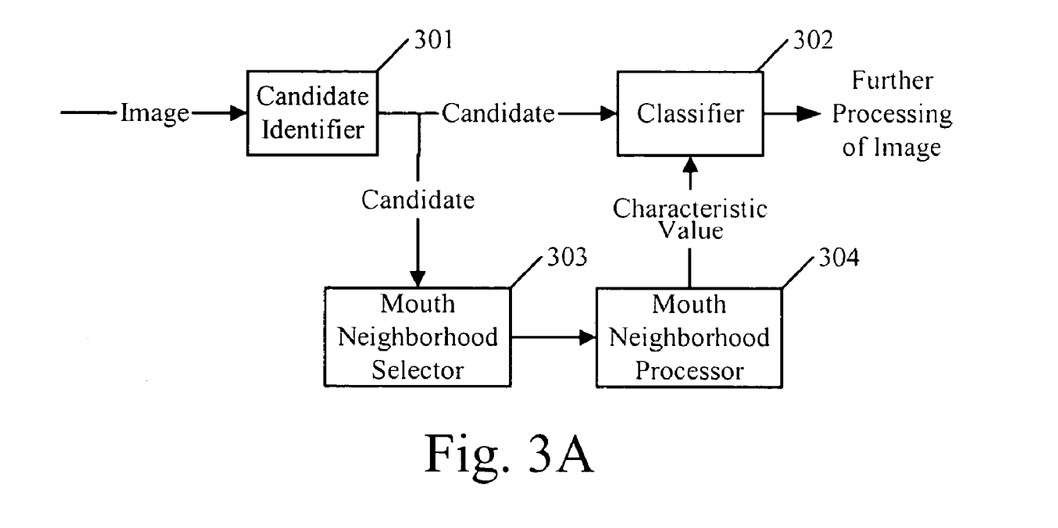
FIG. 3A is a block diagram schematically shows the structure of the apparatus for processing an image according to the present invention.

FIG. 3A is a block diagram schematically shows the structure of the apparatus for processing an image according to the present invention.

As shown in FIG. 3A, reference numeral 301 represents candidate identifier; 302, classifier; 303, mouth neighborhood selector; 304, mouth neighborhood processor.

Candidate identifier 301 is used to identify one candidate for human face region with the image to be processed. Any conventional algorithms for identifying one candidate for human face region within an image can be adopted in candidate identifier 301, and constitute no restriction to the present invention.

Mouth neighborhood selector 303 is used to select a mouth neighborhood within the candidate for human face region that has been identified by candidate identifier 301. As how to select a mouth neighborhood within a human face, detailed description will be given later with reference to FIG. 4.

Mouth neighborhood processor 304, is used to process the mouth neighborhood that has been selected by mouth neighborhood selector 303, and outputs processing results, which are usually some sorts of characteristic values of the mouth neighborhood selected by mouth neighborhood selector 303.

Classifier 302 is used to classify the candidate for human face region that has been identified by candidate identifier 301 as one candidate with high possibility of being a real human face, one candidate with high possibility of being a false human face, a real human face or a false human face, based on the outputs of mouth neighborhood processor 304.

Usually, the outputs of mouth neighborhood processor 304 are some sorts of characteristic values of the mouth neighborhood selected by mouth neighborhood selector 303, if these characteristic values are sufficient for classifier 302 to classify the candidate for human face region as one candidate with high possibility of being a real human face, one candidate with high possibility of being a false human face, a real human face or a false human face.

Figure 3B:
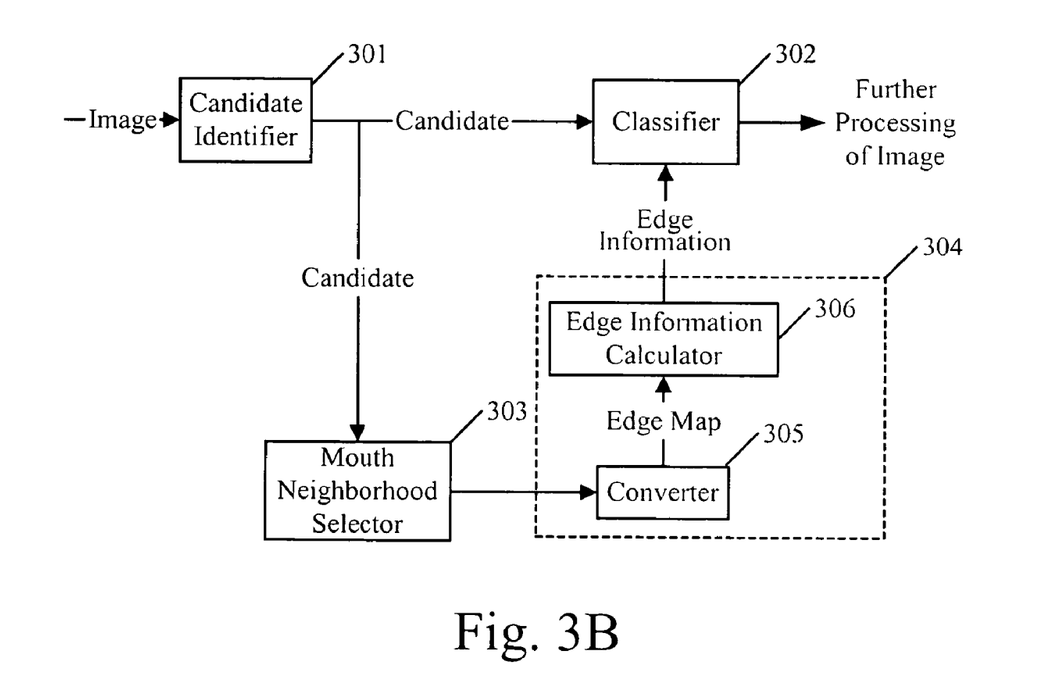
FIG. 3B schematically shows the inner structure of the mouth neighborhood processor shown in FIG. 3A.
Figure 3C:
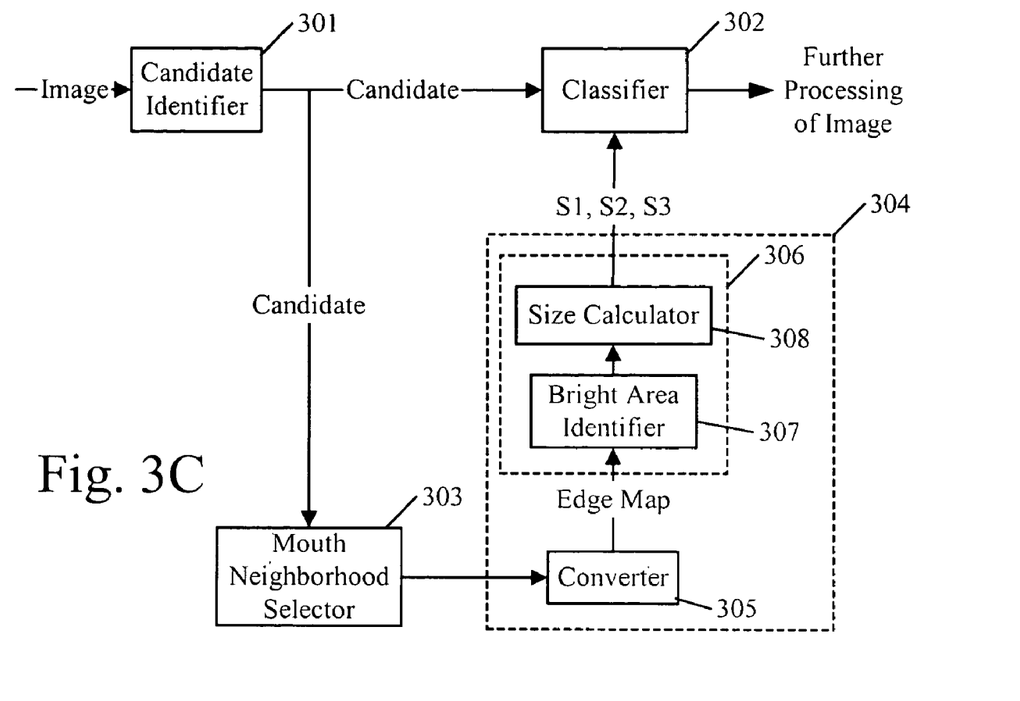
FIG. 3C schematically shows the inner structure of the edge information calculator shown in FIG. 3B.
Figure 3D:
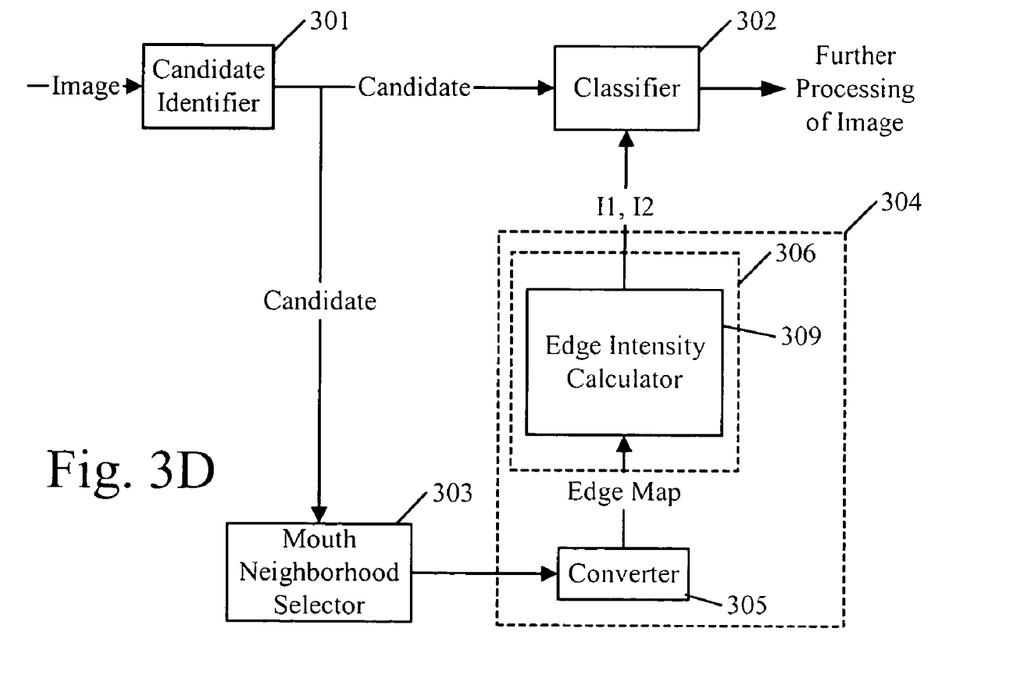
FIG. 3D schematically shows another inner structure of the edge information calculator shown in FIG. 3B.

Although it is shown in FIG. 3A as well as FIGS. 3B to 3D that the candidate for human face region that has been identified by candidate identifier 301 is inputted to classifier 302, it is not necessary to do so in practice. The important is that classifier 302 will know which candidate for human face region is to be classified when it receives the outputs (e.g., characteristic values of one candidate for human face region) from mouth neighborhood processor 304.

The classification result of classifier 302 can be used for further processing of the image.

It should be noted that any methods of processing can be applied by mouth neighborhood processor 304 to the mouth neighborhood as long as the results of the processing of the mouth neighborhood will be sufficient for classifier 302 to classify the candidate for human face region as one candidate with high possibility of being a real human face, one candidate with high possibility of being a false human face, a real human face or a false human face.

FIG. 3B schematically shows the inner structure of mouth neighborhood processor 304 shown in FIG. 3A.

If edge information is utilized in the processing conducted by mouth neighborhood processor 304, mouth neighborhood processor 304 will comprise at least two components, i.e., converter 305 and edge information calculator 306, as shown in FIG. 3B.

Converter 305 receives mouth neighborhood or the entire candidate for human face region outputted by mouth neighborhood selector 303, and converts at least the mouth neighborhood into an edge map. Edge map has been described above.

Edge information calculator 306 is used to calculate edge information for the mouth neighborhood based on the edge map formed by converter 305, and outputs edge information to classifier 302.

Depending upon different types of edge information, edge information calculator 306 has a lot of embodiments, two of which are shown in FIGS. 3C and 3D.

FIG. 3C schematically shows one of the inner structures of the edge information calculator shown in FIG. 3B.

As shown in FIG. 3C, edge information calculator 306 comprises bright area identifier 307 and size calculator 308. Bright area identifier 307 is used to identify within the edge map formed by converter 305 a series of bright areas each of which is composed of pixels whose characteristic values are greater than a first threshold.

A unique method of selecting such pixels, referred to as "binarization," will be illustrated in the four examples described at the end of the specification.

Size calculator 308, is used to calculated the size of the candidate for human face S1 and the size of the biggest bright area S2. If S2/S1 is less than a second threshold, classifier 302 will classify the candidate for human face region as a false human face, or one candidate with high possibility of being a false human face.

Size calculator 308 may also calculates the size of the second biggest bright area S3, among the series of bright areas identified by bright area identifier 307. Then, if S3/S2 is less than a third threshold and the center of the biggest bright area is not in a mouth area, classifier 302 will classify the candidate for human face region as a false human face, or one candidate with high possibility of being a false human face. The mouth area is a predefined portion of the mouth neighborhood, and will be described in detail later with reference to FIG. 4.

If S3/S2 is less than the third threshold and the center of the biggest bright area is in the mouth area, classifier 302 will classify the candidate for human face region as a real human face, or one candidate with high possibility of being a real human face.

If S3/S2 is not less than the third threshold and the midpoint between the centers of the first two biggest bright areas is not in the mouth area, classifier 302 will classify the candidate for human face region as a false human face, or one candidate with high possibility of being a false human face.

If S3/S2 is not less than the third threshold and the midpoint between the centers of the first two biggest bright areas is in said mouth area, classifier 302 will classify the candidate for human face region as a real human face, or one candidate with high possibility of being a real human face.

FIG. 3D schematically shows another inner structure of the edge information calculator shown in FIG. 3B.

As shown in FIG. 3D, edge information calculator 306 comprises an edge intensity calculator 309, which is used to calculate the average edge intensity within the mouth neighborhood (I2) and the average edge intensity within the mouth area (I1).

If the difference (I1−I2) between the average edge intensity within the mouth area and the average edge intensity within the mouth neighborhood is not greater than a fourth threshold, classifier 302 will classify the candidate for human face region as a false human face, or one candidate with high possibility of being a false human face.

If the difference (I1−I2) between the average edge intensity within the mouth area and the average edge intensity within the mouth neighborhood is greater than the fourth threshold, classifier 302 will classify the candidate for human face region as a real human face, or one candidate with high possibility of being a real human face.

Figure 4:
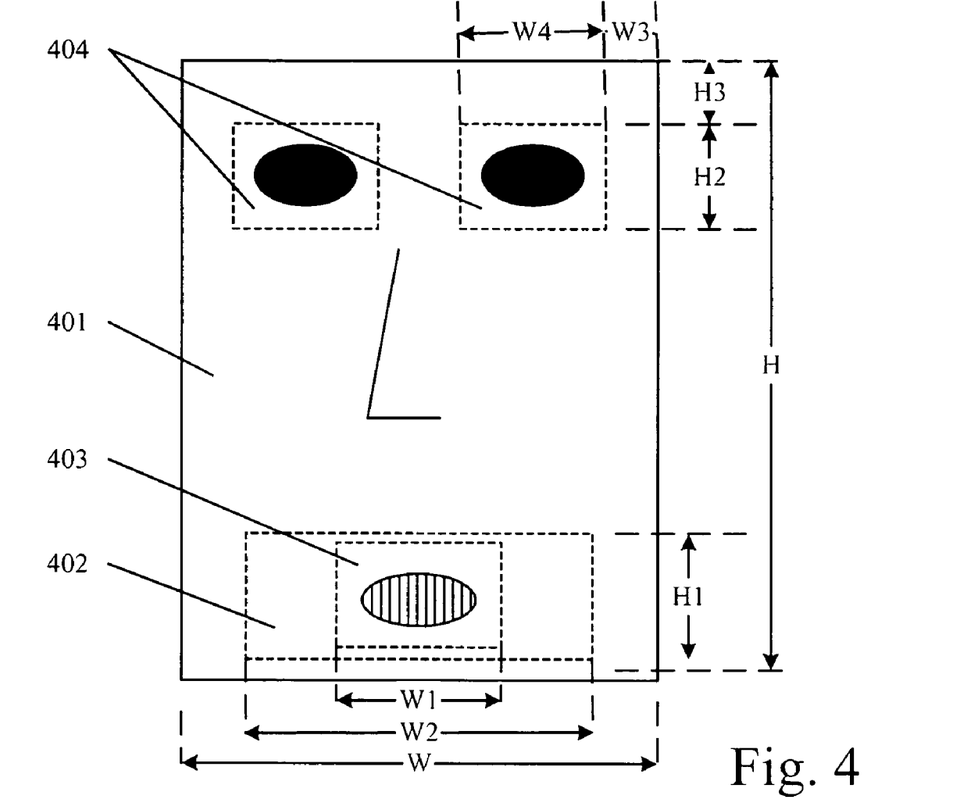
FIG. 4 schematically shows the relationship among mouth neighborhood, mouth area and eye areas within a human face.

FIG. 4 schematically shows the relationship among mouth neighborhood, mouth area and eye areas (right eye area and left eye area) within a human face, or a candidate for human face region.

Reference 401 represents a human face; 402, mouth neighborhood; 403, mouth area; and 404, eye areas.

The width of human face 401 is W, and the height of human face 401 is H.

The width of mouth neighborhood 402 is W2, and the height of mouth neighborhood 402 is H1.

The width of mouth area 403 is W1, and the height of mouth area 403 is at most H1.

The width of eye areas 404 is W4, and the height of eye areas 404 is H2.

The space between eye areas 404 and the vertical border of human face 401 is W3, and the space between eye areas 404 and the top border of human face 401 is H3.

The above width and height satisfy the following equations:

$H1 = H*r1, 0.1 < r1 < 0.7$ $W1 = W*r2, 0.1 < r2 < 0.7$ $W2 = W*r3, 0.2 < r3 < 1$ $W3 = W*r4, 0 < r4 < 0.2$ $W4 = W*r5, 0.1 < r5 < 0.4$ $H2 = H*r6, 0.1 < r6 < 0.4$ $H3 = H*r7, 0.2 < r7 < 0.4$

Preferably, the following is satisfied:
r1=0.3,
r2=0.5,
r3=0.7,
r4=0.125,
r5=0.25,
r6=0.25,
r7=0.3.

The selection of mouth neighborhood and mouth area conducted in FIGS. 1 to 3 may follow the above equations.

Figure 5:
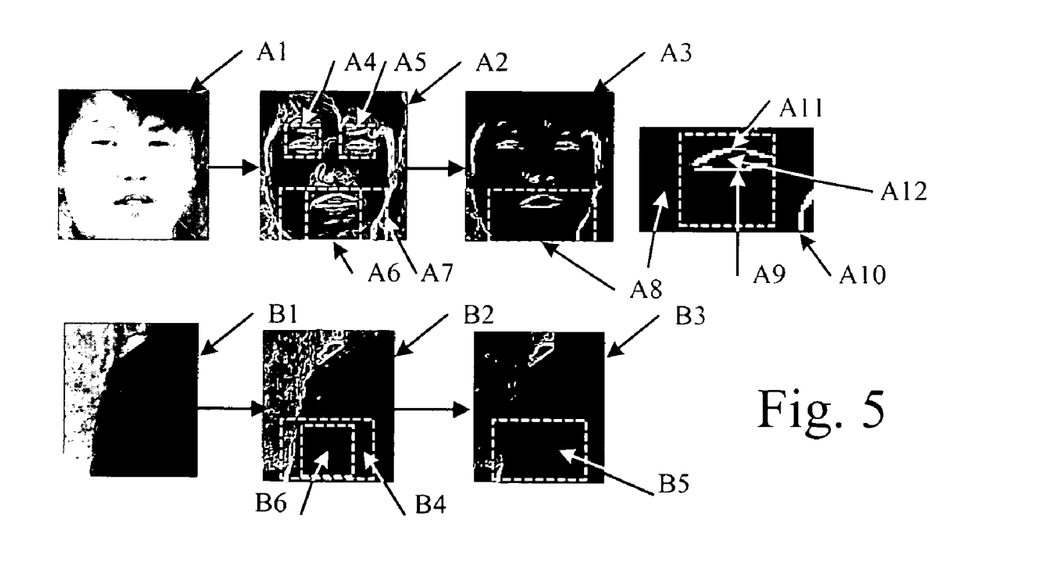
FIG. 5 shows two examples for explaining the methods shown in FIGS. 1 and 2.

FIG. 5 shows two examples for explaining the methods shown in FIGS. 1 and 2.

EXAMPLE 1

As shown in FIG. 5, one candidate for human face region A1 is first identified. With respect to the gray level diagram of candidate for human face region A1, "Sobel" operator is applied, and an edge map A2 is obtained. This process corresponds to step 105 in FIG. 1, or step 205 in FIG. 2.

Next, a mouth neighborhood A7 is selected within edge map A2. This process corresponds to step 104 in FIG. 1 or step 204 in FIG. 2. As described above with reference to FIG. 1, the order of steps 104 and 105 are not critical.

Then, a process called "binarization" is executed with respect to mouth neighborhood A7. This process corresponds to step 106 if FIG. 1.

In this process, a predetermined threshold is used. This threshold is referred to as the first threshold in step 106 of FIG. 1. Here, the first threshold may take a fixed value. It is preferably that the first threshold ranges from 100 to 200. However, it would be more better to select the value for the first threshold based on the average value of the edge intensities of two eye areas A4, A5 within the edge map A2.

Let the width of candidate for human face region A1 be 360, and the height of candidate for human face region A1 be 450. The constants r1, r2, . . . , r7 take their preferred values. Thus,
H1=H*r1=450*0.3=135,
W1=W*r2=360*0.5=180,
W2=W*r3=360*0.7=252,
W3=W*r4=360*0.125=45,
W4=W*r5=360*0.25=90,
H2=H*r6=450*0.25=112.5, and
H3=H*r7=450*0.3=135.

Based on the above constants, mouth area A6, mouth neighborhood A7, eye areas A4 and A5 are obtained as shown in FIG. 5.

Let the threshold for the "binarization" be:

$R9 =$ (the average edge intensity of right eye area+the average edge intensity of left eye area)/2 *$r8$.

Here, r8 is a proportional threshold, ranging from 0.4 to 13, and preferably takes the value of 0.8.

Suppose the average edge intensity of right eye area A4 is 35, and that of left eye area A5 is 31. Let r8=0.8. Then, r9=(35+31)/2*0.8=26.4.

After the "binarization" of mouth neighborhood A7, area A8 is obtained.

Then, a "labeling" process is executed with respect to area A8. The "labeling" process aims to calculate the number of the bright areas located in A8, the centers and sizes of each of the bright areas. This process also corresponds to step 106 in FIG. 1.

After the "labeling" process, it is calculated that there are three bright areas, i.e., A9, A10 and A11, as shown in FIG. 5. The centers of A9, A10 and A11 are (165, 364), (216, 407) and (180, 397) respectively. The sizes of A9, A10 and A11 are 574, 490 and 728 respectively.

Then, it is decided whether there is a prominent bright area among the three bright areas. The size of A1 is S1=360*450=162000. The size of the biggest bright area which is A11 is S2=728. Then, S2/S1=728/162000=0.00449. Let the second threshold be 0.003. Then, S2/S1 is greater than the second threshold. This process corresponds to step 107 in FIG. 1.

Next, it is decided whether there is a bright area which is the most prominent. Among A9, A10 and A11, the first two biggest bright areas are A9 and A11, and their sizes are 574 and 728 respectively. That is, S2=728 and S3=574. Then, S3/S2=574/728=0.7885. Let the third threshold be 0.5. Then, S3/S2 is greater than the third threshold. This process corresponds to step 108 in FIG. 1.

Then, the mid-point between the centers of the first two biggest bright areas A9 and A11 are calculated. Since the centers of A9 and A11 are (165, 364) and (180, 397) respectively, the mid-point between A9 and A11 is ((165+180)/2, (364+397)/2)=(172, 380). The position of the mid-point is shown as A12 in FIG. 5. This process corresponds to step 110 in FIG. 1.

Since the mid-point is located within mouth area A6, candidate for human face region A1 is classified as a real human face, or one candidate with high possibility of being a real human face. This process corresponds to steps 111 and 113 in FIG. 1.

EXAMPLE 2

Also as shown in FIG. 5, candidate for human face region B1 is identified. With respect to the gray level diagram of candidate for human face region B1, "Sobel" operator is applied, and an edge map B2 is obtained.

A "binarization" process is executed with respect to mouth neighborhood B4, and obtains B5.

A "labeling" process is executed with respect to B5, and it is calculated that there is no bright area within B5.

Then, candidate for human face region B1 is classified as a false human face, or one candidate with high possibility of being a false human face. This process corresponds to step 112 in FIG. 1.

EXAMPLE 3

First, the candidate for human face region A1 is identified. Next, with respect to the gray level diagram of candidate for human face region A1, "Sobel" operator is applied, and an edge map A2 is obtained. These processes correspond to steps 203 and 205 in FIG. 2.

Then, the average edge intensities of mouth area A6 and mouth neighborhood A7 are calculated as I1=28 and I2=20. This process corresponds to step 206 in FIG. 2.

Then, it is decided whether the difference between I1 and I2 is greater than the fourth threshold, which preferable takes the value of 5. Since I1−I2=28−20=8, which is greater than 5, candidate for human face region A1 is classified as a real human face, or one candidate with high possibility of being a real human face. These processes correspond to steps 207 and 213 in FIG. 2.

EXAMPLE 4

First, one candidate for human face region B1 is identified. Second, with respect to the gray level diagram of candidate for human face region B1, "Sobel" operator is applied, and an edge map B2 is obtained.

Next, the average edge intensities of mouth area B6 and mouth neighborhood B7 are calculated as I1=0 and I2=0. This process corresponds to step 206 in FIG. 2.

Then, it is decided whether the difference between I1 and I2 is greater than the fourth threshold, which preferable takes the value of 5. Since I1−I2=0−0=0, which is less than 5, candidate for human face region B1 is classified as a false human face, or one candidate with high possibility of being a false human face. These processes correspond to steps 207 and 213 in FIG. 2.

Figure 6:
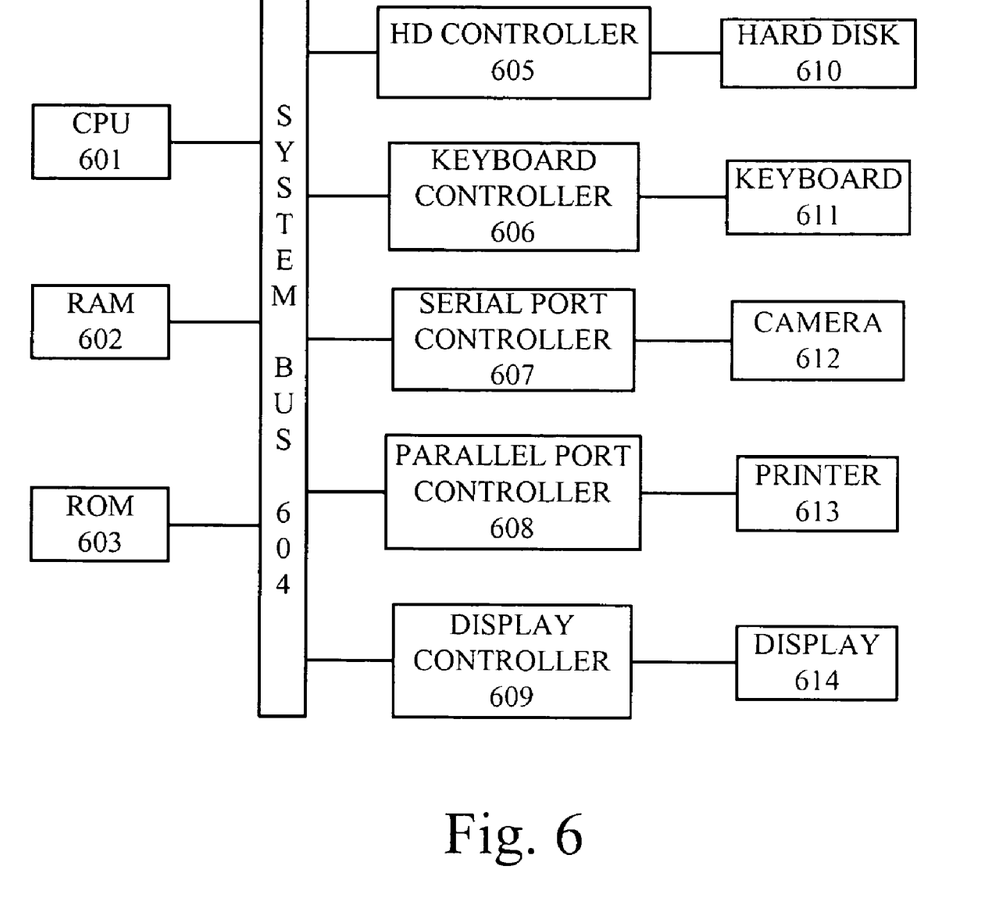
FIG. 6 schematically shows an image processing system in which each method shown in FIGS. 1 and 2 can be implemented.

FIG. 6 schematically shows an image processing system in which each method shown in FIGS. 1 and 2 can be implemented. The image processing system shown in FIG. 6 comprises a CPU (Central Processing Unit) 601, a RAM (Random Access Memory) 602, a ROM (Read only Memory) 603, a system bus 604, a HD (Hard Disk) controller 605, a keyboard controller 606, a serial port controller 607, a parallel port controller 608, a display controller 609, a hard disk 610, a keyboard 611, a camera 612, a printer 613 and a display 614. Among these components, connected to system bus 604 are CPU 601, RAM 602, ROM 603, HD controller 605, keyboard controller 606, serial port controller 607, parallel port controller 608 and display controller 609. Hard disk 610 is connected to HD controller 605, and keyboard 611 to keyboard controller 606, camera 612, to serial port controller 607, printer 613 to parallel port controller 608, and display 614 to display controller 609.

The functions of each component in FIG. 6 are well known in the art and the architecture shown in FIG. 6 is conventional. Such an architecture not only applies to personal computers, but also applies to hand held devices such as Palm PCs, PDAs (personal data assistants), digital cameras, etc. In different applications, some of the components shown in FIG. 6 may be omitted. For instance, if the whole system is a digital camera, parallel port controller 608 and printer 613 could be omitted, and the system can be implemented as a single chip microcomputer. If application software is stored in EPROM or other non-volatile memories, HD controller 605 and hard disk 610 could be omitted.

The whole system shown in FIG. 6 is controlled by computer readable instructions, which are usually stored as software in hard disk 610 (or as stated above, in EPROM, or other non-volatile memory). The software can also be downloaded from the network (not shown in the figure). The software, either saved in hard disk 610 or downloaded from the network, can be loaded into RAM 602, and executed by CPU 601 for implementing the functions defined by the software.

It involves no inventive work for persons skilled in the art to develop one or more pieces of software based on one or more of the flowcharts shown in FIGS. 1 and 2. The software thus developed will carry out the methods of processing an image as shown in FIGS. 1 and 2.

In some sense, the image processing system shown in FIG. 6, if supported by software developed based on flowcharts shown in FIGS. 1 and 2, achieves the same functions as the apparatus for processing image shown in FIGS. 3A to 3D.

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. A method of processing an image, characterized by comprising steps of:
    identifying one candidate for human face region within the image;
    selecting a mouth neighborhood within the candidate for human face region;
    forming an edge map at least corresponding to the mouth neighborhood;
    calculating edge information for the mouth neighborhood based on the edge map; and
    classifying the candidate for human face region based on the edge information.

2. The method of processing an image according to claim 1, characterized in that said step of selecting selects a mouth neighborhood which is r3 times the width of the candidate for human face region, and r1 times the height of the candidate for human face region, wherein r3 is a constant greater than 0.2 and less than 1, and r1 is a constant greater than 0.1 and less than 0.7.

3. The method of processing an image according to claim 2, characterized in that r3 equals 0.7, and said r1 equals 0.3.

4. The method of processing an image according to claim 1, characterized in that said step of calculating edge information comprises steps of:
    selecting a portion of the edge map which corresponds to neighborhood pixels whose characteristic values are greater than a first threshold, resulting in a series of bright areas composed of selected pixels;
    calculating the size S1 of the candidate for human face region and the size S2 of the biggest bright area;
    and in that said step of classifying comprises a step of:
    classifying the candidate for human face region as a false human face, or one candidate with high possibility of being a false human faces if S2/S1 is less than a second threshold.

5. The method of processing an image according to claim 4, characterized in that said step of calculating edge information further comprises a step of:
- calculating the size S3 of the second biggest bright area;

and in that said step of classifying further comprises a step of:
- classifying the candidate for human face region as a false human face, or one candidate with high possibility of being a false human face, if S3/S2 is less than a third threshold and the center of the biggest bright area is not in a mouth area, the mouth area being a predefined portion of the mouth neighborhood.

6. The method of processing an image according to claim 5, characterized in that said step of classifying further comprises a step of:
- classifying the candidate for human face region as a real human face, or one candidate with high possibility of being a real human faces if S3/S2 is less than the third threshold and the center of the biggest bright area is in the mouth area.

7. The method of processing an image according to claim 4, characterized in that said step of calculating edge information further comprises a step of:
- calculating the size S3 of the second biggest bright area;

and in that said step of classifying further comprises a step of:
- classifying the candidate for human face region as a false human face, or one candidate with high possibility of being a false human faces if S3/S2 is not less than a third threshold and the mid-point between the respective centers of the first and second biggest bright areas is not in a mouth area, the mouth area being a predefined portion of the mouth neighborhood.

8. The method of processing an image according to claim 7, characterized in that said step of classifying further comprises a step of:
- classifying the candidate for human face region as a real human face, or one candidate with high possibility of being a real human face if S3/S2 is not less than the third threshold and the mid-point between the respective centers of the first and second biggest bright areas is in the mouth area.

9. The method of processing an image according to claim 1, characterized in that said step of calculating edge information comprises a step of:
- calculating the average edge intensity within the mouth neighborhood and the average edge intensity within a mouth area, the mouth area being a predefined portion of the mouth neighborhood;

and in that said step of classifying comprises a step of:
- classifying the candidate for human face region as a false human face, or one candidate with high possibility of being a false human face if the difference between the average edge intensity within the mouth area and the average edge intensity within the mouth neighborhood is not greater than a predefined threshold.

10. The method of processing an image according to claim 9, characterized in that said step of classifying further comprises a step of:
- classifying the candidate for human face region as a real human face, or one candidate with high possibility of being a real human face, if the difference between the average edge intensity within the mouth area and the average edge intensity within the mouth neighborhood is greater than the predefined threshold.

11. The method of processing an image according to claim 5, characterized in that the mouth area is r2 times the width of the candidate for human face region, and at most r1 times the height of the candidate for human face region, wherein r2 is a constant greater than 0.1 and less than 0.7, and r1 is a constant greater than 0.1 and less than 0.7.

12. The method of processing an image according to claim 11, characterized in that r2 equals 0.5, and said r1 equals 0.3.

13. An apparatus for processing an image, characterized by comprising:
- a candidate identifier, for identifying one candidate for human face region within the image;
- a mouth neighborhood selector, for selecting a mouth neighborhood within the candidate for human face region that has been identified by said candidate identifier;
- a converter, for converting a portion of the image including at least the mouth neighborhood into an edge map;
- an edge information calculator, for calculating edge information for the mouth neighborhood based on the edge map; and
- a classifier, for classifying the candidate for human face region that has been identified by said candidate identifier based on the edge information.

14. The apparatus for processing an image according to claim 13, characterized in that said mouth neighborhood selector selects a mouth neighborhood which is r3 times the width of the candidate for human face region, and r1 times the height of the candidate for human face region, wherein r3 is a constant greater than 0.2 and less than 1, and r1 is a constant greater than 0.1 and less than 0.7.

15. The apparatus for processing an image according to claim 14, characterized in that r3 equals 0.7, and said r1 equals 0.3.

16. The apparatus for processing an image according to claim 13, characterized in that said edge information calculator comprises:
- a bright area identifier, for identifying within the edge map a series of bright areas each of which is composed of pixels whose characteristic values are greater than a first threshold;
- a size calculator, for calculating the size S1 of the candidate for human face region and the size S2 of the biggest bright area;

and in that said classifier classifies the candidate for human face region as a false human face, or one candidate with high possibility of being a false human face, if S2/S1 is less than a second threshold.

17. The apparatus for processing an image according to claim 16, characterized in that said size calculator also calculates the size S3 of the second biggest bright area;

and in that said classifier further classifies the candidate for human face region as a false human face, or one candidate with high possibility of being a false human face, if S3/S2 is less than a third threshold and the center of the biggest bright area is not in a mouth area the mouth area being a predefined portion of the mouth neighborhood.

18. The apparatus for processing an image according to claim 17, characterized in that said classifier further classifies the candidate for human face region as a real human face, or one candidate with high possibility of being a real human faces if S3/S2 is less than the third threshold and the center of the biggest bright area is in the mouth area.

19. The apparatus for processing an image according to claim 16, characterized in that said size calculator also calculates the size S3 of the second biggest bright area;

and in that said classifier further classifies the candidate for human face region as a false human face, or one candidate with high possibility of being a false human face, if S3/S2 is not less than a third threshold and the mid-point between the respective centers of the first and second biggest bright areas is not in a mouth area, the mouth area being a predefined portion of the mouth neighborhood.

20. The apparatus for processing an image according to claim 19, characterized in that said classifier further classifies the candidate for human face region as a real human face, or one candidate with high possibility of being a real human face, if S3/S2 is not less than the third threshold and the mid-point between the respective centers of the first and second biggest bright areas is in the mouth area.

21. The apparatus for processing an image according to claim 13, characterized in that said edge information calculator comprises:
an edge intensity calculator, for calculating the average edge intensity within the mouth neighborhood and the average edge intensity within a mouth area, the mouth area being a predefined portion of the mouth neighborhood;
and in that said classifier classifies the candidate for human face region as a false human face, or one candidate with high possibility of being a false human face, if the difference between the average edge intensity within the mouth area and the average edge intensity within the mouth neighborhood is not greater than a predefined threshold.

22. The apparatus for processing an image according to claim 21, characterized in that said classifier further classifies the candidate for human face region as a real human face, or one candidate with high possibility of being a real human face, if the difference between the average edge intensity within the mouth area and the average edge intensity within the mouth neighborhood is greater than the predefined threshold.

23. The apparatus for processing an image according to claim 17, characterized in that the mouth area is r2 times the width of the candidate for human face region, and at most r1 times the height of the candidate for human face region, wherein r2 is a constant greater than 0.1 and less than 0.7, and r1 is a constant greater than 0.1 and less than 0.7.

24. The apparatus for processing an image according to claim 23, characterized in that said r2 equals 0.5, and said r1 equals 0.3.

* * * * *

UNITED STATES PATENT AND TRADEMARK OFFICE
CERTIFICATE OF CORRECTION

PATENT NO. : 7,403,636 B2
APPLICATION NO. : 10/704591
DATED : July 22, 2008
INVENTOR(S) : Xinwu Chen et al.

It is certified that error appears in the above-identified patent and that said Letters Patent is hereby corrected as shown below:

Col. 1, line 12, "object" should read --objects--.

line 22, "References for example" should read --References, for example,--.

Col. 2 line 21, "diagram" should read --diagram that--.

Col. 4, line 28, "mouse" should read --mouth--.

line 40, "mid-pointed" should read --mid-point--.

line 54, "description" should read --descriptions--.

Col. 5, line 18, "processor 304," should read --processor 304--.

line 21, "sorts" should read --sort--.

line 30, "sorts" should read --sort--.

line 40, After "important" insert --thing--.

Col. 6, line 13, "areas" should read --areas,--.

line 19, "Size calculator 308," should read --Size calculator 308--.

line 25, "calculates" should read --calculate--.

Col. 7, line 67, "more" should be deleted.

Col. 9, line 22, "preferable" should read --preferably--.

line 39, "preferable" should read --preferably--.

line 60, "camera 612," should read --camera 612--.

UNITED STATES PATENT AND TRADEMARK OFFICE
CERTIFICATE OF CORRECTION

PATENT NO. : 7,403,636 B2
APPLICATION NO. : 10/704591
DATED : July 22, 2008
INVENTOR(S) : Xinwu Chen et al.

It is certified that error appears in the above-identified patent and that said Letters Patent is hereby corrected as shown below:

Col. 10, line 66, "faces" should read --face,--.

Col. 11, line 18, "faces" should read --face,--.

line 29, "faces" should read --face,--.

line 39, "face" should read --face,--.

line 53, "face" should read --face,--.

Col. 12, line 37, "areas each of which is" should read --areas, each of which is--.

line 54, "area" (2$^{nd}$ occurrence) should read --area,--.

line 60, "faces" should read --face,--.

Signed and Sealed this

Tenth Day of February, 2009

JOHN DOLL
*Acting Director of the United States Patent and Trademark Office*